July 20, 1948.     H. B. RUDD     2,445,696

LOCK NUT

Filed March 2, 1944

INVENTOR.
Harry B. Rudd,
BY Ward, Crosby & Neal
ATTORNEYS.

Patented July 20, 1948

2,445,696

UNITED STATES PATENT OFFICE 2,445,696

LOCK NUT

Harry B. Rudd, Flushing, N. Y.

Application March 2, 1944, Serial No. 524,681

2 Claims. (Cl. 151—21)

My invention relates to lock nuts and especially to lock nuts adapted for repeated use.

My invention has particular reference to a lock nut having a slot extending thereinto from the periphery thereof and transversely to the longitudinal nut axis to thereby define nut sections integrally secured to each other by a connecting neck, one nut section having an elliptical bolt-receiving passage and the other nut section having a circular bolt-receiving passage alined with said elliptical passage, said nut sections having equal cross-sectional areas, respectively, and the exterior surfaces thereof having similar polygonal configuration.

My invention makes possible a meritorious method of producing a lock nut of the character stated, such method involving the application of compressive force to one of the nut sections throughout substantially the entire height thereof to cause the bolt-receiving passage defined thereby to assume a substantially true elliptical configuration.

Various other objects, advantages and features of my invention will become apparent from the following detailed description.

For an understanding of my invention and for an illustration of one of the forms thereof, reference is to be had to the accompanying drawings, in which.

Figure 1:
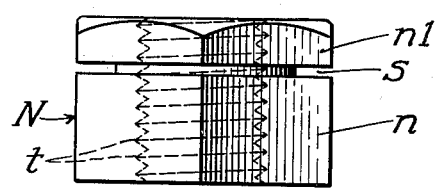
Figure 1 is an elevational view of a partially completed lock nut.
Figure 2:
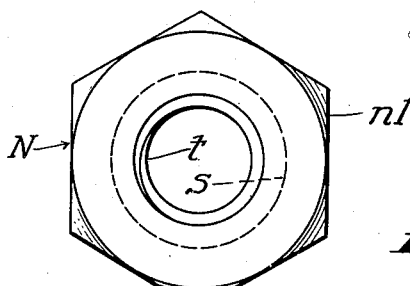
Fig. 2 is a plan view of the lock nut shown in Fig. 1.

Referring to Figs. 1 and 2, N represents a partially completed, metallic nut having a slot $s$ extending thereinto from the periphery thereof and disposed transversely or at right angles to the longitudinal nut axis, said slot $s$ being formed, for example, by a suitable tool operable simultaneously with the tool which cuts the nut from the stock. The slot $s$ defines two nut sections $n$ and $n1$, the lower nut section $n$ having substantially greater height than the upper nut section $n1$. The nut N, as shown in Figs. 1 and 2, has a thread $t$ extending from the bottom to the top thereof, this thread $t$ defining the bolt-receiving passage which is circular throughout the height of said nut N.

In accordance with the invention, the exterior surface of the nut N, throughout the height thereof, is of hexagonal or other suitable polygonal configuration. The exterior surface of the nut section $n1$, then, is polygonal in conformance with the polygonal configuration of the nut section $n$.

Figure 3:
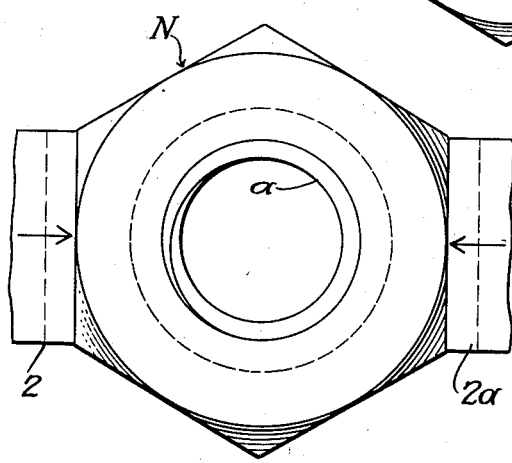
Fig. 3 is a plan view illustrating a step in the formation of my novel lock nut.
Figure 4:
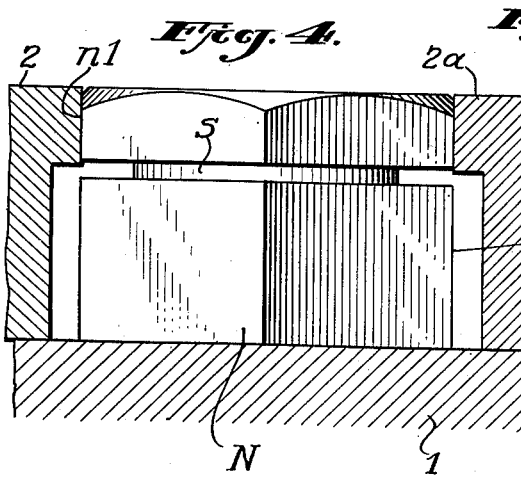
Fig. 4 is an elevational view of the arrangement shown in Fig. 3.

As indicated in Figs. 3 and 4 in order to complete the lock nut of the invention, the nut N is disposed on a suitable support 1 and opposite parallel faces of the nut section $n1$ are engaged by shaping members 2 and $2a$, each of which, preferably, has the same area as that of any nut face, the member 2, preferably although not necessarily, being fixed and the member $2a$ being movable. Thereupon, by suitable means, not shown, the member $2a$ is moved from right to left while holding the member 2 stationary. As a result of this operation, the nut section $n1$ is deformed and the bolt-receiving passage defined thereby is changed from circular configuration as indicated at $a$, Fig. 3, to elliptical configuration as indicated at $a1$, Figs. 5 and 6. The described operation, however, does not cause deformation of the nut section $n$ and, therefore, the bolt-receiving passage defined thereby retains its circular configuration as indicated at $a2$, Figs. 5 and 6.

It will be understood that, irrespective of the position of the slot $s$, the nut section thereabove is deformed to cause the bolt-receiving passage to have elliptical configuration whereas the bolt-receiving passage in said nut N below the slot $s$ retains its original circular configuration.

When the lock nut of my invention is attached to a bolt, the attaching operation causes the elliptical passage in the nut section $n1$ to return approximately to its original circular configuration. This is an unstable condition resulting by reason of the fact that the passage last named tends to resume its elliptical configuration. Therefore, when the nut N is tightened against the work, the thread $t$, throughout the height of the deformed nut section $n1$, engages the bolt thread under the influence of a force which is effective transversely of the bolt axis and also longitudinally of the bolt toward the free end thereof. This causes the desired locking action which is highly effective and adequate to prevent loosening motion of the lock nut from its associated bolt when this assembly is subjected to vibratory motion or other force impulses incident to the operation of machinery.

Figure 5:
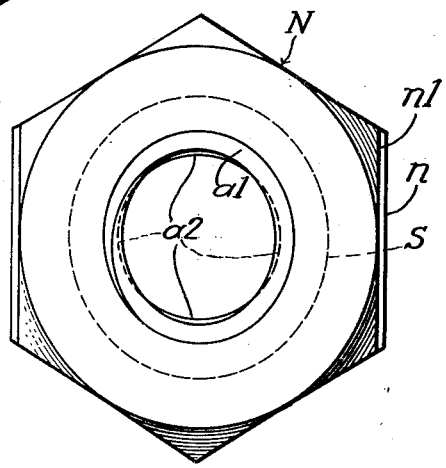
Fig. 5 is a plan view of the completed lock nut.
Figure 6:
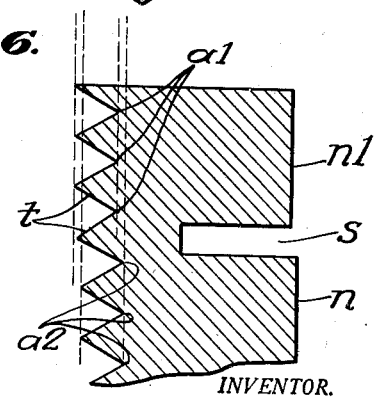
Fig. 6 is a fragmentary sectional view illustrating a feature of the invention.

An important feature of the invention involves the provision of nut sections n and n1 having substantially equal cross-sectional areas respectively, the exterior surfaces of both nut sections having similar configuration. Thus, as disclosed, the nut section n is of hexagonal configuration and, similarly, the nut section n1 is of hexagonal configuration. Both sections, then, have similar wrench-receiving surfaces and, in the completed lock nut, those surfaces are only slightly out of alinement as shown in Fig. 5. By reason of the fact that the cross-sectional area of the nut section n1 is equal to that of the nut section n, said nut section n1 provides a metal section having thickness sufficient to render the elliptical thread entirely operative and practical for the desirable function of the invention.

In accordance with a specific and preferred form of the invention and having reference to a nut wherein the bolt-receiving passage has a diameter of three-eighths inch, the height of the nut section n1 should be 0.125 inch or somewhat less and the depth of the slot s should be 0.032 inch, measured from the mid-point of any flat side, although this may range down to 0.020 inch. In general, with respect to nuts of other sizes, the height of the nut section n1 varies for different sizes of nuts from the preferred value stated above in the same ratio as the diameters of the respective passages through the nuts. Further, the preferred depth of the slots varies for different sizes of nuts from the preferred slot depth in the same ratio as noted above. As stated, the foregoing discussion relates to a specific and preferred form of the invention and it is to be understood therefore that, in no manner at all, is the invention to be limited to this specific example.

Increase in height of the nut section n1 increases the height of the elliptical thread which engages the bolt. This, up to a certain extent, is desirable because increasing the gripping action on the bolt. When the nut N is tightened against the work, forces are set up in the lower nut section n and these forces tend to be transmitted to the upper nut section n1. When the nut comprises a slot s having the proper depth, this slot, to substantial extent, shields the nut section n1 from these forces. Therefore, the nut section n1 retains its desired resilient character in that, when the bolt-receiving passage thereof is deformed to elliptical configuration as stated, this passage tends to return to such elliptical configuration after the nut has been threaded on the bolt whereby the desired locking action of the nut on the bolt is obtained. If the nut does not comprise a slot s having the proper depth, the bolt-receiving passage of the nut section n1 does not tend sufficiently to return to elliptical configuration to produce the desired locking action.

In accordance with the invention, the upper nut section n1 is of polygonal configuration as stated. Accordingly, said upper nut section n1 has such mass that it is not unduly flexible. This condition would not exist, to the desirable extent which is present in the disclosed form of the invention, if the corners of the nut section n1 were cut away so as to obtain a circular top section.

The disclosed arrangement for shaping the upper nut section n1 imparts a configuration to the bolt-receiving passage thereof which is generally elliptical but not necessarily a true geometrical ellipse. The references, then, in this specification and in the appended claims to an "elliptical bolt-receiving passage" of the nut section n1 shall be interpreted as either generally or truly elliptical.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A lock nut having a slot extending thereinto from and throughout the entire periphery thereof, said slot being disposed transversely of the lock nut axis and the interior surface of said slot, through the length thereof, being spaced from the interior lock nut thread to thereby define nut sections integrally secured to each other by a circumferentially complete connecting neck, one nut section having an elliptical bolt-receiving passage, the other nut section having a circular bolt-receiving passage alined with said elliptical passage, said nut sections having substantially equal cross-sectional areas, respectively, and the exterior surfaces thereof having similar polygonal configuration.

2. A lock nut having a slot extending thereinto from and throughout the entire periphery thereof, said slot being disposed transversely of the lock nut axis and the interior surface of said slot, throughout the circular length thereof, being spaced from the interior lock nut thread to thereby define nut sections integrally secured to each other by a circumferentially complete connecting neck, said slot being positioned nearer one end of the nut than the other to thereby cause said nut sections to have substantially different lengths, respectively, the shorter nut section having an elliptical bolt-receiving passage, the longer nut section having a circular bolt-receiving passage alined with said elliptical passage, said nut sections having substantially equal cross-sectional areas, respectively, and the exterior surfaces thereof having similar polygonal configuration.

HARRY B. RUDD.

REFERENCES CITED

The following references are of record in the file of this patent:

UNITED STATES PATENTS

| Number | Name | Date |
|---|---|---|
| 332,540 | Law | Dec. 15, 1885 |
| 1,033,778 | Bonness | July 30, 1912 |
| 1,083,217 | McClellan | Dec. 30, 1913 |
| 1,464,591 | Weichold | Aug. 14, 1923 |
| 1,516,721 | Emery | Nov. 25, 1924 |
| 2,007,293 | Cayouette | July 9, 1935 |
| 2,068,613 | Stoll | Jan. 19, 1937 |
| 2,142,820 | Olson | Jan. 3, 1939 |
| 2,255,286 | Harvey | Sept. 9, 1941 |
| 2,299,085 | Gade | Oct. 20, 1942 |

FOREIGN PATENTS

| Number | Country | Date |
|---|---|---|
| 415,670 | France | July 19, 1910 |
| 708,576 | France | May 4, 1931 |